(12) United States Patent
Steinbeck

(10) Patent No.: US 7,011,187 B2
(45) Date of Patent: Mar. 14, 2006

(54) DEVICE FOR CONTROLLED BEARING SUPPORT OF A COMPONENT ON A VIBRATION DAMPER WITH VISUAL INDICATION OF POSITION ADJUSTMENT

(75) Inventor: Herbert Steinbeck, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/818,980

(22) Filed: Apr. 5, 2004

(65) Prior Publication Data

US 2005/0035510 A1 Feb. 17, 2005

(30) Foreign Application Priority Data

Aug. 13, 2003 (DE) ................................ 103 37 208

(51) Int. Cl.
*F16D 66/00* (2006.01)
(52) U.S. Cl. ........................... 188/1.11 R; 188/1.11 W; 267/141
(58) Field of Classification Search ........... 267/140.11, 267/140.12, 140.13, 219, 220, 136, 137, 267/140.2; 248/636, 560, 603, 618; 188/1.11 R; 73/11.04
See application file for complete search history.

(56) References Cited

U.S. PATENT DOCUMENTS

| 5,088,704 A * | 2/1992 | Kanda ........................ 267/220 |
| 6,439,554 B1 * | 8/2002 | Takashima et al. .... 267/140.13 |
| 6,505,822 B1 * | 1/2003 | Yamamoto et al. .... 267/140.13 |

FOREIGN PATENT DOCUMENTS

DE 4141850 6/1993

* cited by examiner

*Primary Examiner*—James McClellan
*Assistant Examiner*—Mariano Sy
(74) *Attorney, Agent, or Firm*—W. F. Fasse; W. G. Fasse

(57) ABSTRACT

A vibration damper including a damping element in a housing supports a component via a mounting bracket clamped between upper and lower plates after making horizontal adjustments. A hollow adjusting screw, a fixing screw and a counternut achieve a vertical adjustment, and a connection to the damping element. A hollow guide screw and an indicating pin axially slidably extending therethrough have visual alignment sights that indicate the vertical adjustment (via the adjusting screw) of the damping element relative to the housing, to facilitate achieving an optimal neutral loading of the damping element despite dimensional tolerances.

18 Claims, 2 Drawing Sheets

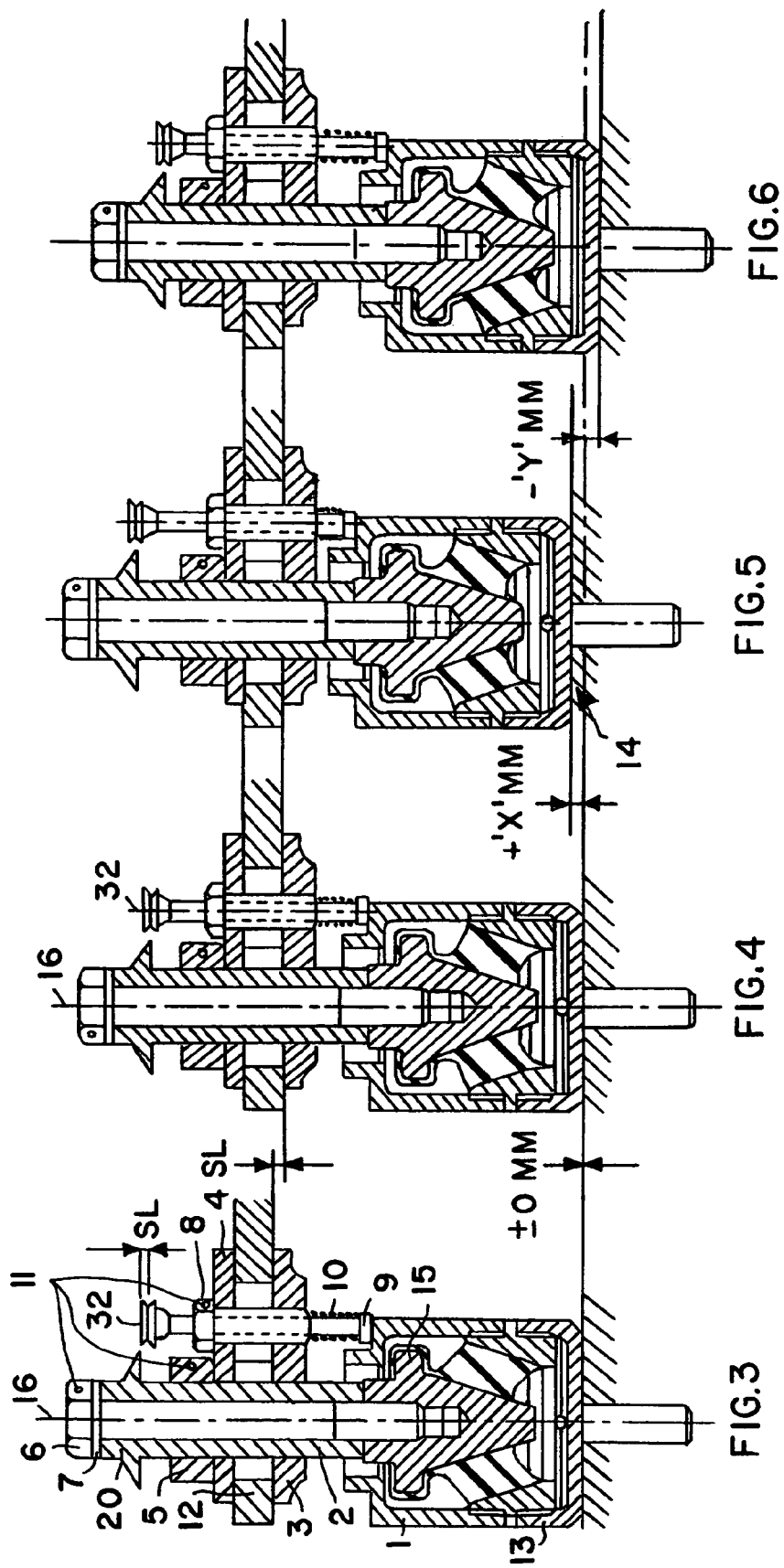

DEVICE FOR CONTROLLED BEARING SUPPORT OF A COMPONENT ON A VIBRATION DAMPER WITH VISUAL INDICATION OF POSITION ADJUSTMENT

PRIORITY CLAIM

This application is based on and claims the priority under 35 U.S.C. §119 of German Patent Application 103 37 208.3, filed on Aug. 13, 2003, the entire disclosure of which is incorporated herein by reference.

FIELD OF THE INVENTION

The invention relates to a shock mount, i.e. a device or apparatus for supporting a component on a vibration damper or shock absorber in a bearing manner, including an adjusting mechanism by which dimensional deviations of the supported component can be compensated for.

BACKGROUND INFORMATION

Various different positive form-locked mechanical bearing support arrangements, as well as pressure-locked or frictionally-engaging mechanical bearing support arrangements of components on vibration dampers (also called vibration absorbers or shock absorbers), are known in the prior art for various different applications. In such known arrangements, it is possible to compensate for dimensional deviations or tolerances of the components, but generally only by installing properly fitted adjusting profiles or sections, for example shim plates or the like. Alternatively, it is necessary to use additional connecting elements with various different proper fitted sizes for achieving a compensation of dimensional deviations. Such dimensional deviations can be caused by construction tolerances and/or installation tolerances and/or system-necessitated tolerances of the materials used for producing the individual parts that are to be connected. It is also possible for such dimensional deviations to arise later due to material strain or deformation of the supported components and/or of the foundation or other supporting structure. Also, such dimensional deviations can be caused directly by the vibration dampers themselves.

Such conventionally known arrangements suffer several disadvantages. Due to the use of various separate loose pieces and parts for such bearing support arrangements, the installation thereof requires a greater installation space. Also, these connections or arrangements result in an increased total weight due to the additional parts necessary for the compensation of dimensional deviations. Furthermore, such connections are more expensive and more time consuming in the installation and assembly, due to the additional individual compensating parts.

Furthermore, it has been recognized that a vibration damper operates most effectively when the compression depth or the sink-in penetration of the supported component onto the damping element is in the optimum range of the damping characteristic of the vibration damper under the nominal rated load. In this context, it is necessary to adjust the support and damper arrangement to achieve such optimal effectiveness. For this, it would be useful to have a visual indication of the actual present compression depth or sink-in penetration depth of the damping element under any particular adjusted condition. However, the prior art has not provided any arrangements with such a visual indication of the damping element compression or sink-in depth. This is especially disadvantageous when the vibration damper is to be installed at a location that is difficult to access and/or visually inspect.

German Patent DE 41 41 850 has disclosed an arrangement of an elastic bearing element that supports a component relative to a foundation in a vibration absorbing or damping manner. This bearing element consists of a bearing underpart, a bearing cap, and an elastomeric block arranged between these two parts. A machine component that is to be supported, e.g. a motor or transmission support lug or foot according to the German Patent, is tightly clamped relative to the bearing cap. For this purpose, a central fixing screw is screwed into an intermediate part, which is supported against the bearing cap. A nut is provided for achieving the clamping. A height adjustment member, which is separated into a lower part and an upper part, is arranged between the component and the bearing cap. The upper part of the height adjustment member can be adjusted in its height relative to the lower part by means of turning, due to its screw thread. Thereby, the height adjustment member is formed by the lower part that is rigidly connected to the bearing cap and the upper part that is height adjustable by means of the threading relative to the lower part. These measures are necessary for the purpose, for example, of ensuring an alignment of a motor shaft with transmission parts, or the like.

In order to check or monitor the height position of the component in the prior art arrangement, the central fixing screw comprises a central bore through which a threaded bolt can be inserted. At its upper end, the threaded bolt comprises a screw cap and a self-locking hex nut for variably fixing or arresting the screw cap relative to the threaded bolt. Furthermore, the threaded bolt can be fixed or arrested in a prescribed position in the central bore of the central fixing screw by means of a fixing or arresting ball arrangement. Alternatively, it is also possible that the height adjustment member could be formed of so-called adjustment shim disks or plates, which are inserted between the bearing cap and the component that is to be supported.

The above described conventional bearing element uses an elastomeric block for absorbing and damping vibrations, whereby this elastomeric block and other parts of the arrangement will undergo deformation or settling over time during use. It is thus evident that an adjustment or compensation of the known bearing element will be necessary over time, to compensate for such settling processes. However, the prior art does not provide any suitable measuring devices or indicators for properly carrying out such a compensation. Thus, due to the functions of its parts, it is recognized that the conventional bearing element would hardly or not at all be suitable for compensating the arising dimensional deviations of a supported component in all three planes within a predefined adjusting range. To the contrary, any compensation is achieved only by means of a height adjustment on the bearing element, which is necessitated by a time-dependent sinking or compressive creeping of the elastomeric block, whereby a continued sinking or compressive creep of that blastomeric block will hardly be influenced.

SUMMARY OF THE INVENTION

In view of the above, it is an object of the invention to provide a device or apparatus for the controlled bearing support of a component on a vibration damper or absorber, by means of which any arising dimensional deviations of the supported component can be compensated in all three planes within an adjustment range. Furthermore, the inventive apparatus shall enable a rational exchange of the vibration damper without requiring the supported component to be moved in its position. Still further, the inventive apparatus shall provide a visual indication and adjusting mechanism in order to achieve the optimum adjustment of the supported component with respect to the damping characteristic of the vibration damper in a controllable and monitorable way. This is to be achieved without requiring a direct visual contact of the vibration damper itself, which might be located outside of an accessible or visible installation position. The invention further aims to avoid or overcome the disadvantages of the prior art, and to achieve additional advantages, as apparent from the present specification. The attainment of these objects is, however, not a required limitation of the present invention.

The above objects have been achieved according to the invention in an apparatus or arrangement for the controlled bearing support of a component on a vibration damper. The vibration damper includes a damping element or body arranged in a housing, which is secured and supported on a foundation or base structure. The component to be supported comprises or is connected to a mounting bracket by which the loads of the component are to be introduced into the vibration damper and particularly the damping element thereof, so as to absorb and damp the vibrations of the loads. The inventive arrangement further includes upper and lower clamping plates, between which the bracket of the component is clampingly secured. This is achieved by means of screws that pass through holes provided in the stacked arrangement of the upper clamping plate, the component's mounting bracket, and the lower clamping plate. Throughout this specification, the term "screw" is used generally to refer to any screw, bolt, threaded stud or threaded fastener having a threaded shaft. The particular preferred arrangement of the inventive apparatus is as follows.

An axially hollow adjusting screw is screwed to a defined adjustment position into a first threaded hole provided in the lower clamping plate, while the hollow shaft of the adjusting screw passes through axially aligned holes in the upper clamping plate and the component's mounting bracket. A fixing screw extends axially through the hollow interior of the adjusting screw, and is screwed into a third threaded hole provided in the damping element of the vibration damper. A threaded counternut is arranged on the threaded shaft of the adjusting screw below a screw head thereof, and is tightly turned against the upper clamping plate. An axially hollow guide screw is arranged parallel to and at a spacing away from the adjusting screw, and passes through further holes in the arrangement of the upper clamping plate, the component's mounting bracket, and the lower clamping plate. Particularly, the guide screw is threaded into a second threaded hole provided in the lower clamping plate, such that the head of the guide screw is tightened against the upper clamping plate. In this manner, the arrangement is secured to the component's mounting bracket in an adjustable manner.

Further, the arrangement additionally includes an adjustment indicator pin (also called simply "adjustment pin" herein) extending axially through the hollow interior of the guide screw, such that the adjustment pin remains axially freely slidable, with the forward end of the adjustment pin positioned and resting on a support surface forming a part of a rim of the outer surface of the housing of the vibration damper. The end of the adjustment pin opposite the forward end is provided with a measuring head that protrudes above the upper clamping plate and the head of the guide screw, and that provides a visual indication of the existing vertical adjustment.

Preferably, the screw head of the adjusting screw is provided with a measuring edge located generally adjacent to the measuring head of the adjustment pin. Thereby, the prevailing adjustment, with respect to the compression depth or sink-in penetration of the damping element, is visually indicated and can be visually inspected by visually checking the alignment or non-alignment of the measuring head of the adjustment pin relative to the measuring edge of the screw head of the adjusting screw.

Generally, in the inventive arrangement, the freely moving adjustment pin essentially provides an indication of the vertical height of the housing of the vibration damper relative to the component's mounting bracket that is tightly clamped between the upper and lower clamping plates. On the other hand, the measuring edge of the screw head of the adjusting screw is adjusted relative to the component's mounting bracket that is clamped tightly between the upper and lower clamping plates, and is then fixed at this adjusted position. This adjusted position relates or corresponds to the existing position, i.e. the compression depth, of the damping element of the vibration damper. Thus, a comparison of the alignment or non-alignment of the measuring edge of the screw head of the adjusting screw relative to the measuring head of the adjustment pin correspondingly indicates the relative height position of the compressed height of the damping element relative to the housing of the vibration damper.

Thus, if there is any vertical tolerance or deviation between the supporting foundation or base structure and the component's mounting bracket, such variances can be compensated for, by readjusting the screwed-in fixed position of the adjusting screw relative to the upper and lower clamping plates, which will correspondingly adjust the neutral compression setting of the damping element within the housing of the vibration damper. As a result, a simple visual inspection while carrying out the initial setting or the later re-adjustment of the arrangement will ensure that the damping element is properly compressed to its optimal neutral compression depth under a neutral or nominal load condition.

BRIEF DESCRIPTION OF THE DRAWINGS

In order that the invention may be clearly understood, it will now be described in connection with an example embodiment thereof, with reference to the accompanying drawings, wherein:

FIG. 3 is a view of the apparatus according to FIG. 1 in an unloaded condition with a normal adjustment of the apparatus;

FIG. 4 is a view of the apparatus according to FIG. 3, in a normal loaded condition, without dimensional deviations especially of the supporting base, whereby the adjustment pin visually indicates the neutral adjustment position, so that no re-adjustment of the adjusting screw is necessary;

FIG. 5 is a view of the arrangement according to FIGS. 1, 3 and 4, but after the adjusting mechanism has been readjusted to compensate for an upward dimensional deviation of the supporting base; and FIG. 6 is a view similar to that of FIG. 5, but after the adjusting mechanism has been readjusted to compensate for a downward dimensional deviation of the supporting base.

DETAILED DESCRIPTION OF A PREFERRED EXAMPLE EMBODIMENT AND OF THE BEST MODE OF THE INVENTION

Figure 1:
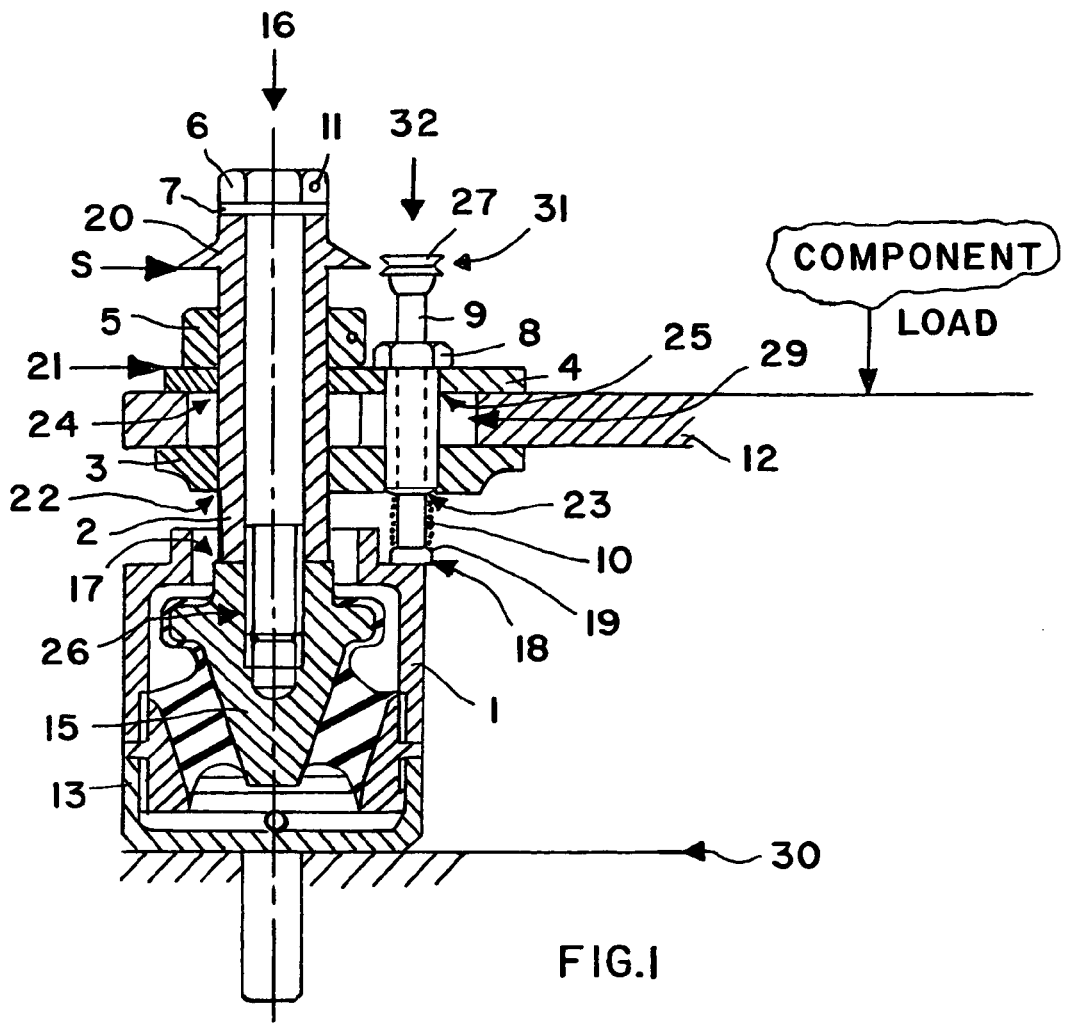
FIG. 1 is a schematic vertical section through an apparatus according to the invention for the controlled bearing support of a component on a vibration damper.

FIG. 1 shows the device or apparatus according to the invention, for the controlled bearing support of a component on a vibration damper, so as to absorb and damp the vibrations of the component while also bearing the loads thereof. The component to be supported is not expressly shown, but is merely schematically indicated in FIG. 1. A mounting bracket 12 extends from or is connected to the component to be supported. In this example, the bracket 12 and various parts of the apparatus extend substantially horizontally (i.e. within a range of tolerance and vibrational variation about true horizontal), so that the loading is substantially vertical, but this is merely an example and not a limitation of the invention. To the contrary, the inventive apparatus can also be used in different orientations.

Via the illustrated mounting bracket 12, the loads and vibrations of the component are to be introduced into the vibration damper 1. The dimensions, configuration and arrangement of the mounting bracket 12 with respect to the component to be supported are preferably such that the vibration damper 1 is accessible for an easy installation and/or removal thereof. While FIG. 1 shows only one bracket 12, one vibration damper 1, and one device according to the invention, it should be understood that the component is actually supported on a plurality of such vibration dampers via plural such devices and plural such brackets, whereby the adjustments of the devices will serve to compensate any dimensional deviations or tolerances, and to properly "trim" or balance the relative loading on the several vibration dampers.

Each vibration damper 1 includes a housing 13 that is supported on a supporting pedestal or base structure 30, as well as a damping member or element 15 which is to receive, absorb and damp the vibrations while transferring the loads via the housing 13 into the supporting base structure 30. While the damping element 15 may comprise an elastomeric body or the like, it preferably further comprises various other components involved in mounting and securing the element 15 in the housing 13, and transmitting the loads or forces via the element 15 into the housing 13. For example, the element 15 can include bonded elastomeric layers or parts and metal layers or parts. In this regard, the damping element 15 can have any conventionally known construction and arrangement. The damping element 15 is adapted to yield and recoil in a lossy manner especially in the vertical direction, and thereby absorbs and damps out vibration loads that are introduced into it.

In order to secure the mounting bracket 12 of the component and couple the loads and vibrations thereof into the apparatus, the apparatus includes lower and upper clamping plates 3 and 4, between which the mounting bracket 12 is securely clamped. To achieve this clamping and to provide an adjusting mechanism as will be described further below, the apparatus further includes an axially hollow adjusting screw 2, a fixing screw 6 extending axially through the hollow interior of the adjusting screw 2, a threaded counternut 5 arranged on the threaded shaft of the adjusting screw 2 on top of the upper clamping plate 4, a washer 7 interposed between the heads of the adjusting screw and the fixing screw, an axially hollow guide screw 8, an adjustment indicator pin (or simply "adjustment pin") 9 extending axially through the hollow interior of the guide screw 8, and a compression spring 10 arranged on the adjustment pin protruding below the lower clamping plate. To secure the various screws so as to prevent their inadvertent rotational shifting or loosening, each screw may have a securing hole 11 therein, and a securing wire (not shown) passes through the respective securing holes to secure the respective positions of the screws. The details of the arrangement, interaction and functional operation of these various components will now be described in the following.

Before mounting the bracket 12 on the inventive apparatus, the housing 13 of the vibration damper 1 is arranged and secured on the supporting pedestal or base structure 30, either directly as shown in FIG. 1 or indirectly via an interposed support body or shim 14 according to FIG. 5. The housing 13 of the vibration damper 1 can be secured in any known manner, for example preferably by bolting or the like through an oversized hole, to allow for shifting adjustment of the housing 13 in the plane of the surface of the base structure 30 before securing the housing with the bolt. Alternatively, the housing could be welded or otherwise fixed at a suitable location on the base structure 30.

Figure 2:
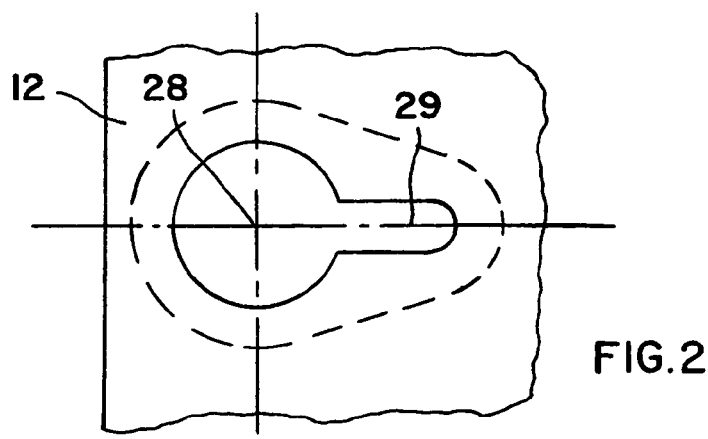
FIG. 2 is a schematic top plan view of a portion of the mounting bracket of the component supported in the apparatus according to FIG. 1.

In order to receive the above mentioned screws extending through the stacked or sandwiched arrangement of the upper clamping plate 4, the mounting bracket 12, and the lower clamping plate 3, these parts each have respective aligned holes therethrough. Particularly, each of the clamping plates 3 and 4, as well as the bracket 12 respectively has two holes spaced apart from one another in a profile longitudinal axis direction 21 of the mounting bracket 12, and these two holes are aligned respectively through the lower clamping plate 3, the bracket 12, and the upper clamping plate 4. The holes in the lower clamping plate 3 include a first threaded hole 22 and a second threaded hole 23. The holes in the mounting bracket 12 include a third circular hole 28 and a fourth elongated slot hole 29, whereby these two holes 28 and 29 are continuously joined to each other to form an overall keyhole configuration, as shown especially in FIG. 2. The holes in the upper clamping plate 4 include a first plain unthreaded hole 24 and a second plain unthreaded hole 25. A third threaded hole 26 is let into an upper planar contact surface 17 of the damping element 15.

The above described components are arranged and assembled as follows. The lower and upper clamping plates 3 and 4 are arranged with their surfaces extending parallel to the planar upper contact surface 17 of the damping element 15, of which the orientation and position is substantially parallel with the base surface of the housing 13, corresponding to the plane of the supporting foundation or base structure 30. The bracket 12 is received between the two clamping plates 3 and 4, with the various holes of these parts axially aligned with one another as described above. These parts are also generally aligned axially over the third threaded hole 26 in the damping element 15, while the damping element 15 remains laterally movable in all horizontal directions within a slight limited range within the housing 13 of the vibration damper 1.

The hollow adjusting screw 2 is inserted to extend through the first unthreaded hole 24 of the upper clamping plate 4 and the third hole 28 of the mounting plate 12, and is then threaded into the first threaded hole 22 of the lower clamping plate 3. Particularly, the threaded shaft of the adjusting screw 2 is threaded into the first threaded hole 22 of the lower clamping plate 3 to approximately a middle or center screwing adjustment position, for example. At this point, the adjusting screw 2 stands perpendicularly, e.g. in this example vertically, on the planar contact surface 17 of the damping element 15. Also, the damping element 15 (as mentioned above) and preferably also the overall vibration damper 1 remains horizontally movable in all directions in a limited range on the supporting base structure 30. For example, in this regard, the housing 13 of the vibration damper 1 may be initially loosely mounted on the supporting base structure 30 by a mounting bolt received in an oversized hole. Also, the hole diameter of the third circular hole 28 in the mounting bracket 12 is substantially larger than the outer diameter of the shaft of the adjusting screw 2. Thus, at this stage, the clamping plates 3 and 4 can be horizontally shifted in all directions relative to the mounting bracket 12 in the limited range provided by the oversized holes, and the vibration damper 1 can also be horizontally shifted, as needed. Thereby any horizontal dimensional deviations or tolerances between the position of the mounting bracket 12 and the position of the supporting base structure 30 can be compensated for.

Next, the fixing screw 6 is inserted through the hollow interior of the adjusting screw 2, along the same first screw axis 16, which also coincides with the axis of the third threaded hole 26 provided in the damping element 15. The forward end of the threaded shaft of the fixing screw 6 is screwed into the threaded hole 26 in the damping element 15 to such an extent that the annular end face of the hollow shaft of the adjusting screw 2 comes to rest and is pressed onto the contact surface 17 of the damping element 15 circumferentially around the third threaded hole 26 in the damping element 15. The fixing screw is initially not yet tight, but still remains somewhat loose or screwable. At this stage, the fixing screw is fixedly positioned in its horizontal plane, with respect to the damping element 15.

After all of the support bearings of the component have been properly horizontally oriented or positioned, the adjusting screw 2 is turned in the threaded hole 22 of the lower clamping plate 3, whereby the vertical protruding length of the adjusting screw 2 below the lower clamping plate 3 is adjusted. This in turn tends to adjust the height of the mounting bracket 12 of the component while also adjusting the loading force applied onto the damping element 15. In this manner, simultaneously, all dimensional deviations or tolerances of the vibration damper 1 as well as its supporting base structure 30, and the dimensional deviations of the mounting bracket 12 or of the component are compensated. Thereby, the position of the component is determined in the vertical plane, i.e. with respect to its vertical height. Once the final position of the adjusting screw 2 and therewith the clampingly held mounting bracket 12 of the component is set as needed, the threaded counternut 5 is turned on the threaded shaft of the adjusting screw 2 so as to be screwed down against the upper clamping plate 4 with a prescribed torque. This tightly clamps the upper clamping plate 4 toward the lower clamping plate 3, so as to securely clamp and fix the mounting bracket 12 between the two clamping plates 3 and 4. This serves to fix the horizontal position of the mounting bracket 12 in a force-locked, e.g. frictionally clamped, manner in the horizontal direction, and to fix the vertical position thereof in a form-locked, e.g. positively engaged, manner in the vertical direction.

Thereafter, the fixing screw 6, which extends axially through the hollow interior of the adjusting screw 2, is screwed into the threaded hole 26 of the damping element 15 with a prescribed torque, in order to securely fix this arrangement. Particularly, this pulls the annular end face of the hollow shaft of the adjusting screw 2 with the prescribed force against the planar contact surface 17 of the damping element 15, and thereby securely connects the adjusting screw 2 and fixing screw 6, and therewith the overall mounting and adjusting mechanism, in a load-transmitting manner, to the damping element 15 of the vibration damper 1.

Furthermore, the axially hollow guide screw 8 is inserted through the second unthreaded hole 25 of the upper clamping plate 4, and the threaded shaft of the guide screw 8 is screwed into the second threaded hole 23 of the lower clamping plate 3. Meanwhile, the shaft of the guide screw 8 extends through the fourth elongated slot hole 29 of the mounting bracket 12, whereby the diameter or width of the elongated slot hole 29 is larger than the outer diameter of the shaft of the guide screw 8, so as to allow the horizontal shifting adjustment of the bracket 12 as described above. In the present illustrated example embodiment, the outer diameter of the threaded shaft of the adjusting screw 2 is larger than the outer diameter of the guide screw 8. The screw head of the guide screw 8 is then tightened against the upper clamping plate 4 with a prescribed torque, whereby this also serves to tightly clamp the two clamping plates 3 and 4 together, with the mounting bracket 12 clampingly held therebetween.

Next, the adjustment pin 9 is axially movably inserted into the hollow interior of the guide screw 8, along the common second screw axis 32 of the guide screw 8, which extends perpendicularly relative to the clamping plates 3 and 4 and the mounting bracket 12, and also substantially perpendicularly relative to a support surface 18 formed by a rim of the housing 13 of the vibration damper 1. The lower or forward end of the adjustment pin 9 comprises a support foot 19 in the manner of a thickened foot on the end of the pin shaft of the adjustment pin 9. However, the outer diameter of this thickened or wider support foot 19 of the adjustment pin 9 must be smaller than the clear inner diameter of the threaded hole 23 of the lower clamping plate 3, so that the guide screw 8 and adjustment pin 9 can be inserted into this threaded hole 23. Preferably, the support foot 19 must have an outer diameter that is smaller than the inner diameter of the hollow interior of the guide screw 8, or must be removable from the shaft of the adjustment pin 9, so that the adjustment pin 9 can be readily inserted or removed through the hollow interior of the guide screw 8. This support foot 19 will come to rest freely or loosely on the support surface 18 formed by the rim or ledge of the housing 13 of the vibration damper 1.

A compression spring 10 is arranged coaxially around the portion of the pin shaft of the adjustment pin 9 protruding downwardly between the lower clamping plate 13 and the support foot 19 of the adjustment pin 9. Thereby, the compression spring is braced with a compressed biasing force between the lower clamping plate 3 (or the bottom end of the guide screw 8) and the support foot 19 of the adjustment pin 9. Thereby the support foot 19 is urged downwardly to remain in contact with the support surface 18 of the housing 13 of the vibration damper 1, while still allowing the adjustment pin 9 to move axially up and down in the hollow interior of the guide screw 8 if the distance between the vibration damper 1 and the bracket 12 changes. In this manner, the depth to which the adjustment pin 9 protrudes downwardly from the guide screw 8 toward and into contact with the housing 13 of the vibration damper 1 is directly dependent on and indicative of the distance between the lower clamping plate 3 (as well as the overall fixing and adjusting mechanism) and housing 13 of the vibration damper 1.

Once the fixing and adjusting mechanism has been arranged and fixed in the above described manner, it may further be secured to prevent an unintended loosening of the various screws and the like. This may be achieved, for example, in that the head of the fixing screw 6, and/or of the adjusting screw 2, and/or of the guide screw 8, and/or the threaded nut 5 are each provided with a securing hole 11, through which a securing wire is inserted and twisted tight, in order to prevent these various screws and nut from turning and thereby loosening. The securing wire itself is not shown in the drawings for clarity and simplicity.

Throughout this discussion, the term "screw" refers to any threaded screw, bolt, stud, or the like, and includes a threaded or partially threaded shaft and an enlarged head at one end. The particular details of the configuration, e.g. the length, the diameter, the thread pitch, and the like of the various screws, as well as the dimensions and other characteristics of the clamping plates and the vibration damper itself can be selected variously, depending on the particular needs of the application at hand, for example depending on the mass, size, vibration amplitude, etc. of the component that is to be supported in a vibration damping manner. The total sum of the dimensional variations or deviations that are to be compensated must also be taken into account in the proper design of the overall apparatus. The assembly, adjustment, fixing and securing of the overall apparatus on the vibration dampers can generally be carried out using conventional commercially available tools, such as hand wrenches and the like for turning the heads, e.g. hex heads, of the various screws.

If any part of the apparatus, and/or the entire apparatus, and/or any part or the entirety of the vibration damper 1, is to be exchanged or replaced, e.g. after a service interval or total operating life, the assembly of the apparatus as described above can be easily reversed, or at least partially loosened to allow such replacement or exchange of parts. Particularly, by loosening the fixing screw 6 out of the vibration damper 1, and loosening the threaded counternut 5, the adjusting screw 2 may then be loosened, which releases its clamping effect on the clamping plates 3 and 4. By also loosening the guide screw 8, it thereby releases its clamping effect on the clamping plates 3 and 4. Thereby, the mounting bracket 12 is loosened or released between the two clamping plates 3 and 4. This allows the disassembly and removal of any parts. Furthermore, or alternatively, the guide screw 8 can remain secured in position so as to maintain the tight clamping of the upper and lower clamping plates 4 and 3 onto the mounting bracket 12, while only the counternut 5 and the fixing screw 6 are loosened so as to separate the fixing and adjusting mechanism from the vibration damper 1, thereby allowing the vibration damper 1 or at least the damping element 15 to be exchanged, while still retaining the fixing and adjusting mechanism clamped tightly onto the mounting bracket 12.

When the fixing and adjusting mechanism or apparatus is assembled in the above described manner, it visually indicates the adjusted vertical position of the damping element 15 relative to the housing 13 of the vibration damper 1, and further facilitates the initial adjustment and/or a later readjustment of this vertical position. The visual indication of the vertical height adjustment is given by the relative vertical positions of the screw head 20 of the adjusting screw 2 relative to the screw head or measuring head 27 of the adjustment pin 9, as follows.

The screw head 20 of the adjusting screw 2 is preferably provided with a measuring edge S in the form of a radially outwardly protruding rim with a circumferential edge that tapers to an acute angle. Thereby, the vertical height or position of this acutely tapering circumferential edge or rim forming the measuring edge S provides a precise visual indication of the adjusted vertical height of the adjusting screw 2. On the other hand, the measuring head 27 of the adjustment pin 9 is provided with a V-shaped notched or recessed circumferential groove around the circumferential rim thereof. This recessed groove around the circumference of the measuring head 27 provides a precise visual indication of the vertical position or height of the adjustment pin, which corresponds to the position of the housing 13 of the vibration damper 1, because the support foot 19 at the opposite end of the adjustment pin 9 remains in contact with or pressed against the support surface 18 along the rim of the housing 13 of the vibration damper 1, especially under the biasing influence of the compression spring 10.

Thus, in order to achieve the intended purpose of visually monitoring the supported position of the component on and relative to the vibration damper 1 via the mounting plate 12 and the inventive support bearing and adjusting apparatus, a visual alignment or measuring sight line 31 can be observed by using the recessed groove on the rim of the measuring head 27 of the adjustment pin 9 as a notch sight (like the rear sight of a gun), and using the acutely tapered edge forming the measuring edge S of the head 20 of the adjusting screw 2 as a bead sight (like the front sight of a gun). In this manner, the relative vertical positions of the adjusting screw 2 and the adjustment pin 9 can easily be determined, i.e. by visually checking whether the acute tapered measuring edge S of the adjusting screw 2 is visually aligned with the horizontal plane of the V-shaped recessed notch at the edge of the measuring head 27 of the adjustment pin 9, or whether the measuring edge S falls above or below the horizontal plane defined by the measuring head 27.

The axial lengths of the adjusting screw 2 and the adjustment pin 9 are selected appropriately for the particular application, so that the measuring edge S would be perfectly aligned on a horizontal plane with the V-shaped recessed groove of the measuring head 27 when the vibration damping element 15 is in its optimum neutral compressed position for the nominal load of the component being supported, relative to the defined or fixed position of the housing 13 of the vibration damper 1. Namely, the measuring head 27 of the adjustment pin 9 indicates the vertical position of the housing 13, while the measuring edge S of the adjusting screw 2 indicates the vertical position of the damping element 15, and the relative lengths of the adjusting screw and the adjustment pin are selected such that a proper relative position of the damping element 15 and the housing 13 results in a proper alignment of the measuring edge S with the notch of measuring head 27.

If the optimal intended vertical adjustment is not achieved, i.e. is not indicated by a proper alignment of the measuring edge S with the measuring head 27 by means of the perceived visual alignment or measuring sight line 31 thereof, then the vertical adjustment must simply be readjusted. To achieve this, the threaded counternut 5 and the fixing screw 6 are slightly loosened, and then the adjusting screw 2 is screwed more or less deeply into and through the first threaded hole 22 of the lower clamping plate 3, until the proper visual alignment 31 is achieved. Then, the fixing screw 6 and the counternut 5 are once again tightened to the proper specified torque. By this readjustment, the spacing or height between the lower clamping plate 3 and the planar contact surface 17 at the top of the damping element 15 is adjusted, which thereby also serves to adjust the degree of vertical loading and compression of the damping element 15 in the neutral or static condition.

FIGS. 3 to 6, as will be discussed next, show four different situations involving different adjustment conditions of the inventive apparatus. Namely, these figures show the unloaded condition and three different situations of a loaded condition, whereby the loaded conditions represent the maximum, the minimum, and a neutral tolerance deviation in the vertical direction or height of the fixing points on which the vibration dampers are positioned. Generally, these schematic principle illustrations demonstrate that the visual alignment 31 between the adjustment pin 9 and the adjusting screw 2 can be adjusted as necessary for proper compensation, by varying the compression or penetration depth of the damping element 15 into the housing 13 of the vibration damper 1, via the adjustment of the adjusting screw 2, in order to compensate for various different dimensional tolerances of the component being mounted via the mounting bracket 12 relative to the supporting base structure 30.

More particularly, FIG. 3 shows the adjusted and fixed condition of the inventive apparatus, yet in the unloaded state, i.e. before the nominal load of the supported component has been vertically applied to the damping element 15 via the mounting bracket 12, the clamping plates 3 and 4, and the adjusting screw 2. In this unloaded condition of the vibration damper 1, the damping element 15 has not yet been compressed down into its optimal neutral or nominal loaded position. Thus, the measuring edge of the screw head 20 of the adjusting screw 2 is positioned higher than or above the measuring head of the adjustment pin 9 by the amount SL. This amount SL represents the amount of compressive deflection that the upper surface of the damping element 15 shall undergo to be optimally compressed by the nominal neutral or static load of the component to be supported.

FIG. 4 shows the loaded condition of the unloaded arrangement of FIG. 3. Now that the nominal, neutral or static load of the supported component has been applied vertically onto the damping element of the vibration damper, the damping element has been compressed somewhat down into the housing of the vibration damper (by the distance SL). As a result, the adjusting screw 2 has moved downwardly along with the clamping brackets relative to the adjustment pin. Viewed alternatively, the adjustment pin 9 has moved relatively upward and come into alignment on the same horizontal plane with the measuring edge of the screw head of the adjusting screw. This represents the optimum damping operating point or pre-loading of the damping element 15.

FIG. 5 shows a situation in which a dimensional tolerance of the component of +X mm (e.g. +3 mm) exists and must be compensated. This is represented, for example, by a 3 mm thick support body 14 interposed between the supporting base structure 30 and the housing 13 of the vibration damper 1. As a result, the vibration damper 1 is vertically higher relative to the position of the mounting bracket 12 of the component to be supported. This is indicated by the measuring head of the adjustment pin 9 moving relatively upwardly, i.e. protruding to a greater vertical height above the upper clamping plate 4. To maintain the damping element 15 in the optimal loading condition, the adjusting screw 2 is screwed somewhat out of the threaded hole in the lower clamping plate, such that the entire adjusting screw 2 is vertically raised by +X mm relative to the clamping plates. Thereby, the proper alignment of the measuring edge of the adjusting screw and the measuring head of the adjustment pin is established, and the damping element 15 is brought into the optimal neutral load condition.

FIG. 6 shows a dimensional tolerance or deviation in the opposite direction in comparison to FIG. 5. Namely, FIG. 6 shows a dimensional tolerance of −Y mm, for example −3 mm, of the height of the vibration damper 1 in comparison to the nominal position shown in FIG. 3. Thus, the measuring head of the adjustment pin moves downward by Y mm, and the adjusting screw must be screwed downwardly by Y mm farther into the threaded hole of the lower clamping plate. This once again establishes the proper alignment of the measuring edge of the adjusting screw with the measuring head of the adjustment pin, and therewith the optimal nominal load condition of the damping element 15.

In all of the preceding conditions, the length of the adjustment pin 9 being used basically must be selected for the prescribed load that is to be carried by the vibration damper, to establish the optimal loading thereof. These adjustments are carried out individually for each one of several of these apparatuses that support the given component via several respective mounting brackets. Thereby, the loading of each apparatus, i.e. each vibration damper, can be optimized, whereby the vibration damping operation is optimized.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A vibration-damping mounting apparatus for supporting a component with respect to a base structure, wherein the component has a mounting bracket extending therefrom, and wherein said apparatus comprises:

a vibration damper that includes a housing and a damping element arranged in and connected to said housing, and that is adapted to be supported by and secured to the base structure;

first and second clamping plates that clampingly hold the mounting bracket therebetween;

an adjusting screw arrangement that passes through said clamping plates while being axially adjustable and fixable along a first axis perpendicular to said clamping plates, and that is secured at a first end thereof to said damping element, and that has a first visual position indicator at a second end thereof indicating a first axial adjustment position of said adjusting screw arrangement along said first axis; and an adjustment indicator pin arrangement that passes through said clamping plates while remaining axially slidable along a second axis perpendicular to said clamping plates, and that has a first end thereof contacting said housing, and that has a second visual position indicator at a second end thereof indicating a second axial adjustment position of said adjustment indicator pin arrangement along said second axis.

2. The apparatus according to claim 1, wherein said first visual position indicator positively indicates a position of said damping element along said first axis, and said second visual position indicator positively indicates a position of said housing of said vibration damper along said second axis.

3. A vibration-damping mounting apparatus for supporting a component with respect to a base structure, wherein the component has a mounting bracket extending therefrom, and wherein said apparatus comprises:

a vibration damper that includes a housing and a damping element arranged in and connected to said housing, and that is adapted to be supported by and secured to the base structure;

a first clamping plate that has first and second clearance holes therein;

a second clamping plate that has first and second threaded holes therein, and that is arranged spaced apart from said first clamping plate so as to receive the mounting bracket clampingly held between said first and second clamping plates;

an axially hollow adjusting screw that includes an adjusting screw head and an adjusting screw shaft with a threading, and that has an axially extending hollow interior, and that is arranged with said adjusting screw shaft extending through said first clearance hole and through a first hole area provided in the mounting bracket, said threading of said adjusting screw shaft screwed into and through said first threaded hole, and said adjusting screw shaft positioned on and transmitting loads onto said damping element;

a threaded counternut that is arranged on said threading of said adjusting screw shaft between said adjusting screw head and said first clamping plate, and that is tightened against said first clamping plate thereby exerting a first clamping force onto the mounting bracket between said first and second clamping plates;

a fixing screw that includes a fixing screw head and a fixing screw shaft with a threading, and that is arranged with said fixing screw shaft extending axially through said hollow interior of said adjusting screw and being connected in a load-transmitting manner to said damping element;

an axially hollow guide screw that includes a guide screw head and a guide screw shaft with a threading, and that has an axially extending hollow interior, and that is arranged with said guide screw shaft extending through said second clearance hole and through a second hole area provided in the mounting bracket, said threading of said guide screw shaft screwed into said second threaded hole, and said guide screw head tightened against said first clamping plate thereby exerting a second clamping force onto the mounting bracket between said first and second clamping plates; and an adjustment indicator pin that extends axially slidably through said hollow interior of said guide screw, with a first end of said adjustment indicator pin protruding out from said guide screw head and a second end of said adjustment indicator pin protruding out from said guide screw shaft and contacting said housing of said vibration damper;

wherein a visual adjustment indication can be obtained by visually checking relative positions of said adjusting screw head and said first end of said adjustment indicator pin relative to each other.

4. The apparatus according to claim 3, wherein said damping element has a third threaded hole therein, and said fixing screw shaft is connected in a load-transmitting manner to said damping element by being screwed with said threading of said fixing screw shaft into said third threaded hole.

5. The apparatus according to claim 4, wherein said damping element has a planar contact surface that extends perpendicularly to said adjusting screw shaft and said fixing screw shaft and that has said third threaded hole passing therethrough, and wherein said adjusting screw shaft has an annular shaft end surface that is seated and pressed against said planar contact surface of said damping element around said third threaded hole.

6. The apparatus according to claim 5, wherein said planar contact surface of said damping element, said first and second clamping plates, and the mounting bracket of the component are all respectively parallel to one another.

7. The apparatus according to claim 3, wherein said first and second clamping plates are substantially horizontal upper and lower clamping plates respectively, the mounting bracket of the component extends substantially horizontally, and predominantly vertical loads are introduced from the mounting bracket via said clamping plates, said adjusting screw and said fixing screw into said damping element of said vibration damper.

8. The apparatus according to claim 3, wherein a first screw axis common to said adjusting screw and said fixing screw, and a second screw axis common to said guide screw and said adjustment indicator pin, are parallel to each other and spaced apart from each other by a defined spacing distance.

9. The apparatus according to claim 3, further comprising a support body interposed between said housing of said vibration damper and said base structure.

10. The apparatus according to claim 3, wherein the mounting bracket is configured as a flat planar plate, and the first and second hole areas are united to form a single contiguous hole including the first and second hole areas.

11. The apparatus according to claim 10, wherein the first hole area comprises a circular hole, the second hole area comprises an elongated slot hole, and the single contiguous hole is a keyhole-shaped hole formed of the circular hole and the elongated slot hole united contiguously with one another.

12. The apparatus according to claim 11, wherein the circular hole has a hole diameter larger than an outer diameter of said adjusting screw shaft by an amount providing a tolerance compensation range in all directions in a plane of the mounting bracket, and the elongated slot hole has at least a slot length that is larger than an outer diameter of said guide screw shaft by said amount, to thereby allow free aligning and tolerance compensating movement of said clamping plates, said adjusting screw and said guide screw relative to the mounting bracket in the plane of the mounting bracket before tightening said counternut and said guide screw head.

13. The apparatus according to claim 3, wherein said adjustment indicator pin includes a pin shaft with said first and second ends, and a radially enlarged measuring head provided at said first end of said pin shaft.

14. The apparatus according to claim 13, wherein said adjusting screw head includes a first visual indicator formation along its circumference, and said measuring head of said adjustment indicator pin includes a second visual indicator formation along its circumference.

15. The apparatus according to claim 14, wherein one of said visual indicator formations comprises an acutely radially-outwardly tapering circumferential edge, and another of said visual indicator formations comprises a radially-inwardly recessed circumferential groove.

16. The apparatus according to claim 15, wherein said visual adjustment indication involves visually sighting along said circumferential groove and said circumferential edge, to visually determine whether said circumferential edge is aligned on a common plane with said circumferential groove, whereby a degree of alignment or misalignment is indicative of a degree of mechanical loading of said damping element from the mounting bracket via said adjusting screw and said fixing screw.

17. The apparatus according to claim 13, wherein said adjustment indicator pin further includes a support foot at said second end of said pin shaft, and further comprising a compression spring that is arranged on said pin shaft and is interposed and exerts a biasing force between said support foot and at least one of said second clamping plate and said guide screw shaft, so as to bias said support foot into contact with said housing of said vibration damper.

18. The apparatus according to claim 17, wherein said support foot has a diameter smaller than respective diameters of said second clearance hole, said second threaded hole, and the second hole area.

* * * * *